(12) United States Patent
Putnam et al.

(10) Patent No.: US 7,617,077 B2
(45) Date of Patent: Nov. 10, 2009

(54) METHOD AND APPARATUS FOR AUTOMATICALLY DISCOVERING HIERARCHICAL RELATIONSHIPS IN PLANAR TOPOLOGIES

(75) Inventors: Christopher Eric Putnam, Henniker, NH (US); Mark W. Anderson, Manchester, NH (US)

(73) Assignee: Autodesk, Inc., San Rafael, CA (US)

( * ) Notice: Subject to any disclaimer, the term of this patent is extended or adjusted under 35 U.S.C. 154(b) by 406 days.

(21) Appl. No.: 10/954,542

(22) Filed: Sep. 29, 2004

(65) Prior Publication Data

US 2005/0114107 A1 May 26, 2005

Related U.S. Application Data

(60) Provisional application No. 60/507,062, filed on Sep. 29, 2003, provisional application No. 60/507,080, filed on Sep. 29, 2003, provisional application No. 60/506,975, filed on Sep. 29, 2003, provisional application No. 60/506,974, filed on Sep. 29, 2003.

(51) Int. Cl.
*G06F 17/50* (2006.01)
*G06F 17/00* (2006.01)

(52) U.S. Cl. .......................... 703/1; 345/418
(58) Field of Classification Search ................ 703/1; 345/418; 382/256
See application file for complete search history.

(56) References Cited

U.S. PATENT DOCUMENTS

| | | | | |
|---|---|---|---|---|
| 5,329,464 A | * | 7/1994 | Sumic et al. | 703/1 |
| 5,553,211 A | * | 9/1996 | Uotani | 345/641 |
| 5,555,354 A | * | 9/1996 | Strasnick et al. | 345/427 |
| 6,259,451 B1 | * | 7/2001 | Tesler | 345/419 |
| 6,732,120 B1 | * | 5/2004 | Du | 707/104.1 |
| 6,907,364 B2 | | 6/2005 | Poolla et al. | |
| 6,912,692 B1 | | 6/2005 | Pappas | |
| 6,965,945 B2 | * | 11/2005 | Lin et al. | 709/242 |
| 7,054,741 B2 | | 5/2006 | Harrison et al. | |
| 7,164,883 B2 | | 1/2007 | Rappaport et al. | |
| 2001/0049704 A1 | | 12/2001 | Hamburg et al. | |
| 2003/0158668 A1 | | 8/2003 | Anderson | |
| 2004/0004611 A1 | | 1/2004 | Komornicki et al. | |
| 2004/0076279 A1 | * | 4/2004 | Taschereau | 379/218.01 |
| 2005/0034075 A1 | * | 2/2005 | Riegelman et al. | 715/714 |
| 2005/0068315 A1 | | 3/2005 | Lewis et al. | |

OTHER PUBLICATIONS

Schoenstein, Springer Berlin / Heidelberg, 2001, AutoCAD Land Development Desktop Release 2i , vol. 2181/2001, pp. 39-42.*
Shirley Schussman, Martin Bertram, Bernd Hamann, Kenneth I. Joy, Hierarchical Data Representations based on Planar Voronoi Diagrams, in "Proceedings of the Joint Eurographics and IEEE TVCG Conference on Visualization 2000 (VisSim '00)", pp. 63-72, 2000.*

(Continued)

*Primary Examiner*—Kidest Bahta
*Assistant Examiner*—Eunhee Kim
(74) *Attorney, Agent, or Firm*—Gates & Cooper LLP (57) ABSTRACT

A CAD/GIS system that automatically discovers hierarchical relationships between root faces/parcels, smaller faces/parcels, and other defined areas of land. As the definitions are entered into the system, hierarchical relationships are created by the system to ease data management functions.

25 Claims, 10 Drawing Sheets

OTHER PUBLICATIONS

Gold, "Applications of dynamic voronoi data structures. In Oral Presentation," Second European Conference on Geographic Information Systems, Brussels, Belgium 1991, http://www.voronoi.com/pdfs/1990-1994/application_of_dynamic_voronoi_data_structures.pdf. Printed May 28, 2007.

Schneider et al., "GPU-friendly high-quality terrain rendering," Journal of the WSCG, vol. 14, 2006, http://wwwcg.in.tum.de/Research/data/Publications/wscg06.pdf.

Fowler et al., "Automatic extraction of irregular network digital terrain models," In Proc. ACM SIGGraph '79, pp. 199-207, 1979.

Lindstrom et al, "Visualization of large terrains made easy," in Proc. IEEE Visualization '01, pp. 363-370, 2001.

Lindstrom et al., "Terrain simplification simplified: A general framework for view-dependent out-of-core visualization," IEEE Transactions on Visualization and Computer Graphics, 8(3):239-254, 2002.

Koller et al., "Virtual GIS: A real-time 3D geographic information system," In Proc. IEEE Visualization 95, pp. 94-100, 1995.

Suter et al., "Automated generation of visual simulation databases using remote sensing and GIS," In IEEE Visualization '95, pp. 86-93, 1995.

The Voronoi Web Site 1990-1995. http://www.voronoi.com/pubs_1990.htm. Printed on May 28, 2007.

Giordan et al. "Using Adobe Photoshop 5", Jul. 1998, published by Que, copyright 1998, pp. 128, 130-131, 346-351, 361.

Blatner et al. "Essential Photoshop 6 Tips," Aug. 13, 2001, via AdobePress www.adobepress.com/articles/printerfriendly.asp?p=22789, article courtesy of PeachPit Press.

* cited by examiner

METHOD AND APPARATUS FOR AUTOMATICALLY DISCOVERING HIERARCHICAL RELATIONSHIPS IN PLANAR TOPOLOGIES

CROSS-REFERENCE TO RELATED APPLICATIONS

This application claims the benefit under 35 U.S.C. Section 119(e) of the following commonly-assigned U.S. provisional patent applications, all of which are incorporated by reference herein:

Provisional Application Ser. No. 60/507,062, filed Sep. 29, 2003, by Christopher E. Putnam and Mark W. Anderson, entitled "PARCEL DESIGN AND PLANAR TOPOLOGY,";

Provisional Application Ser. No. 60/507,080, filed Sep. 29, 2003, by Sreenadha B. Godavarthy, John M. Lewis, Thomas M. Inzing a, Edward J. Connor, Robert B. Todd, Jr., and Christopher E. Putnam, entitled "SURFACE PROCESSING,";

Provisional Application Ser. No. 60/506,975, filed Sep. 29, 2003, by Kumud Dev Vaidya, Michael C. Rogerson, and Bhamadipati S. Rao, entitled "HORIZONTAL ALIGNMENT PROCESSING,"; and Provisional Application Ser. No. 60/506,974, filed Sep. 29, 2003, by Kumud Dev Vaidya, Michael C. Rogerson, and Bhamadipati S. Rao, entitled "VERTICAL ALIGNMENT PROCESSING,".

This application is related to the following co-pending and commonly-assigned patent applications, all of which are incorporated by reference herein:

Utility application Ser. No. 10/954,526, filed on Sep. 29, 2004, by Christopher E. Putnam and Mark W. Anderson, entitled "METHOD FOR DYNAMICALLY UPDATING A PLANAR TOPOLOGY,";

Utility application Ser. No. 10/953,806, filed on Sep. 29, 2004, by Sreenadha B. Godavarthy and John M. Lewis, entitled "SURFACE SMOOTHING TECHNIQUES,";

Utility application Ser. No. 10/953,807, filed on Sep. 29, 2004, by Kumud Dev Vaidya, Michael C. Rogerson, and Bhamadipati S. Rao, entitled "INTERACTIVE CONSTRAINT-BASED ALIGNMENT OBJECTS,";

Utility application Ser. No. 10/954,529, filed on Sep. 29, 2004, by Christopher E. Putnam and Mark W. Anderson, entitled "INTERACTIVE METHOD FOR DESIGNING PARCELS,";

Utility application Ser. No. 10/953,934, filed on Sep. 29, 2004, by John M. Lewis, Thomas M Inzing a and Edward J. Connor, entitled "INTERACTIVE TRIANGULATED IRREGULAR NETWORK (TIN) SURFACES DESIGN,"; and Utility application Ser. No. 10/953,245, filed on Sep. 29, 2004, by John M. Lewis, Robert B. Todd, Jr., Edward J. Connor, and Christopher E. Putnam, entitled "SURFACE CONSTRUCTION AUDIT TRAIL AND MANIPULATION,".

BACKGROUND OF THE INVENTION

1. Field of the Invention

The present invention relates generally to computer aided design (CAD) applications and geographic information systems (GIS), and in particular, to a method, apparatus, and article of manufacture for automatically discovering hierarcical relationships in planar technologies.

2. Description of the Related Art

Computer aided design (CAD) applications are traditionally used for creating and editing drawings (e.g., maps, floor plans, and engineering designs). Further, CAD applications enable users to create/modify highly precise and accurate drawings/maps. Civil engineers and surveyors, for whom precision and accuracy are of primary importance, have adopted CAD applications to speed data input and perform computations for design projects.

Geographic information systems (GIS) have been traditionally used for spatial analysis and mapping and allow users to store, retrieve, manipulate, analyze, and display geographically referenced data. However, traditional GIS have been aimed at general cartography and broad land-use analysis, and not precision design for the construction and management of real-world projects. In this regard, the geometric precision that many engineers require has not been provided by traditional GIS systems.

Some GIS companies have attempted to use complex databases to model real-world objects. However, such databases are still built on points, lines, and polygons and cannot store geometric objects in a traditional CAD application (e.g., true arcs or road spirals). As such, use of CAD systems in a GIS environment has been limited, because the results have been less than favorable.

Many organizations have used both CAD and GIS tools in different departments to utilize the different specific features available. Further, data from original CAD drawings may be frequently imported or digitized for use in the GIS mapping environment. However, because of the limitations of GIS systems and/or CAD systems, during such a transition, data connectivity, accuracy, and geometric precision are often lost. Accordingly, what is needed is an integrated solution that provides the functionality and tools of a GIS system with the precision and accuracy of a CAD application.

In an attempt to address the above concerns, industry specific components were built on top of the CAD engine to address specialized needs and eventually, an integrated solution was developed (e.g., Autodesk Map™ software available from the assignee of the present invention). Integrated solutions attempt to provide GIS functionality (e.g., multiuser editing, polygon overlay and analysis, topology, thematic mapping, etc.) within a CAD application and spatial database. The integrated solution allows civil engineers the ability to integrate the precision engineering tasks (from CAD) (e.g., site, roadway, and hydrological design) with the spatial analysis tools and data management of GIS. Such systems are known as CAD/GIS systems.

Nonetheless, the integrated solutions may have various limitations. As such, there is a need in the art that allows for the use precision engineering CAD programs and systems in a GIS environment.

SUMMARY OF THE INVENTION

To minimize the limitations in the prior art, and to minimize other limitations that will become apparent upon reading and understanding the present specification, the present invention discloses a method and apparatus for automatically discovering hierarchical relationships in planar topologies.

Embodiments of the invention provide methods, apparatuses, and articles of manufacture for creating hierarchical relationships in a computer assisted design and geographic information (CAD/GIS) system. A method in accordance with the present invention comprises defining at least one face within the CAD/GIS system, where the face is defined as a closed polygon, defining at least one area of land within the CAD/GIS system, wherein the area is a closed polygon within the face, and automatically creating a hierarchy between the face and the area within the CAD/GIS system, wherein the face has a higher level on the hierarchy than the area.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a CAD/GIS system that automatically discovers hierarchical relationships between faces. The present invention can be used to subdivide parcels of land into residential and commercial lots or parcels, as well as right-of-ways and public areas. As the geographical and positional data for the site map is entered into the CAD/GIS system, the root face of land, lots, and other area definitions are automatically placed into a hierarchical relationship, which stores the data and definitions in a manner that minimizes rework of the definitions.

Hardware Environment

Figure 1:
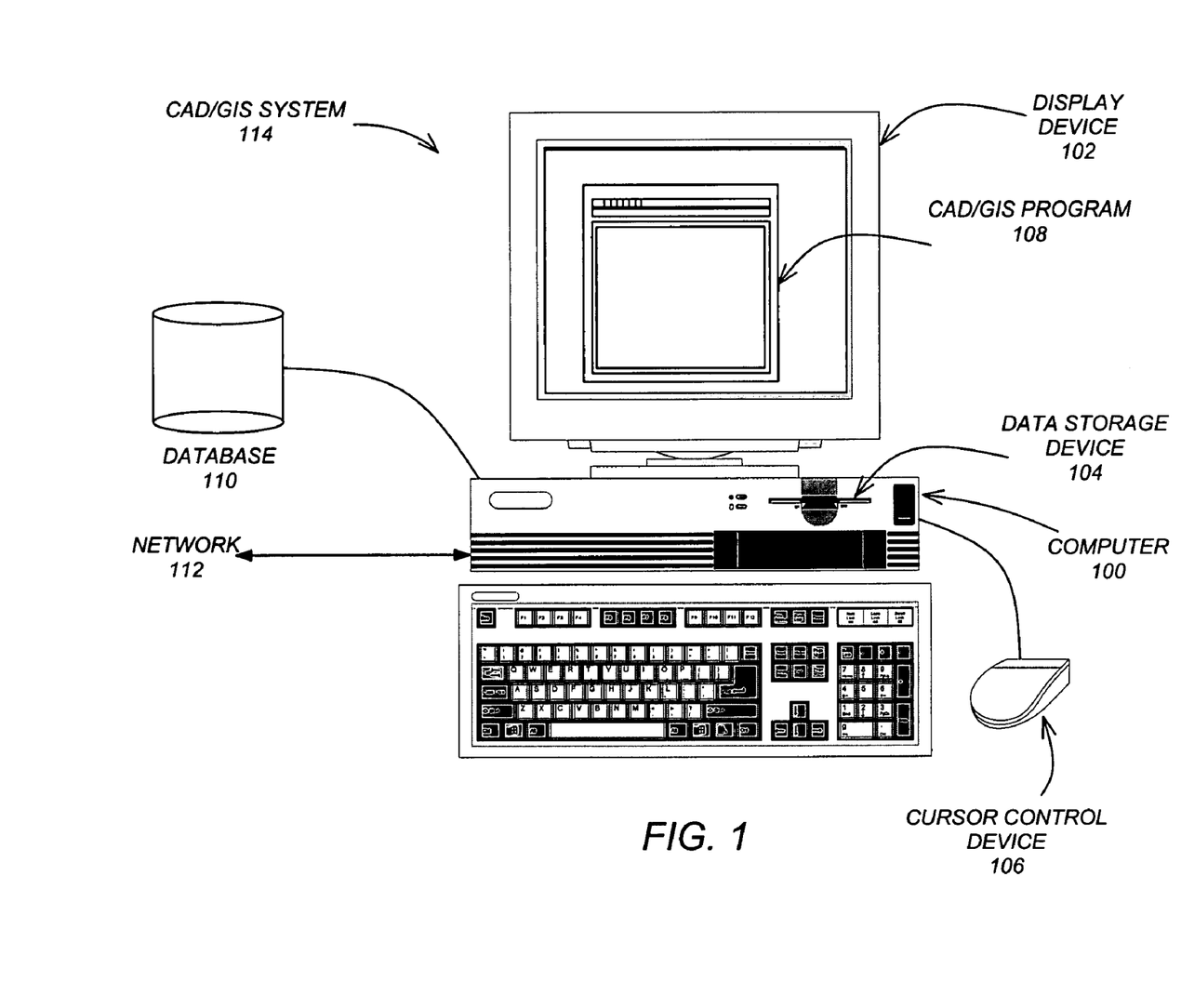
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented Computer Aided Design/Geographical Information System (CAD/GIS) program 108, wherein the CAD/GIS program 108 is represented by a window displayed on the display device 102. Preferably, the CAD/GIS program 108 comprises the AUTODESK LAND SOLUTIONS suite of products, which includes the AUTODESK LAND DESKTOP 2005 and AUTODESK CIVIL DESIGN 2005. More information on these products can be found in the manuals entitled, "Autodesk Land Desktop/Getting Started," March 2004 and "Autodesk Civil Design/Getting Started," March 2004, both of which are incorporated by reference herein.

Generally, the CAD/GIS program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc. Further, the CAD/GIS program 108 may utilize a database 110 such as a spatial database.

Computer 100 may also be connected to other computers 100 (e.g., a client or server computer) via network 112 comprising the Internet, LANs (local area network), WANs (wide area network), or the like. Further, database 110 may be integrated within computer 100 or may be located across network 112 on another computer 100 or accessible device.

Those skilled in the art will recognize that the exemplary environment illustrated in FIG. 1 is not intended to limit the present invention. Indeed, those skilled in the art will recognize that other alternative environments may be used without departing from the scope of the present invention. Accordingly, FIG. 1 illustrates an integrated CAD/GIS system 114 that combines the traditional capabilities of CAD and GIS tools with common spatial management features. In this regard, such an integrated solution enables the use of true geometry, precision, powerful creation and editing tools, and drawing and document production of a CAD system in addition to the GIS capabilities for polygons, topology, overlay analysis, seamless database use, and thematic mapping.

Discovering and Generating Hierarchical Relationships

The present invention allows for selective coupling of two or more planar topologies which allows for suitable update and query by the CAD/GIS program 108. The planar topologies, often referred to as "layers" or "levels" in a CAD system, allow for systematic and hierarchical arrangement of the features in the CAD/GIS program 108, which simplifies the management of such a system.

Figure 2:
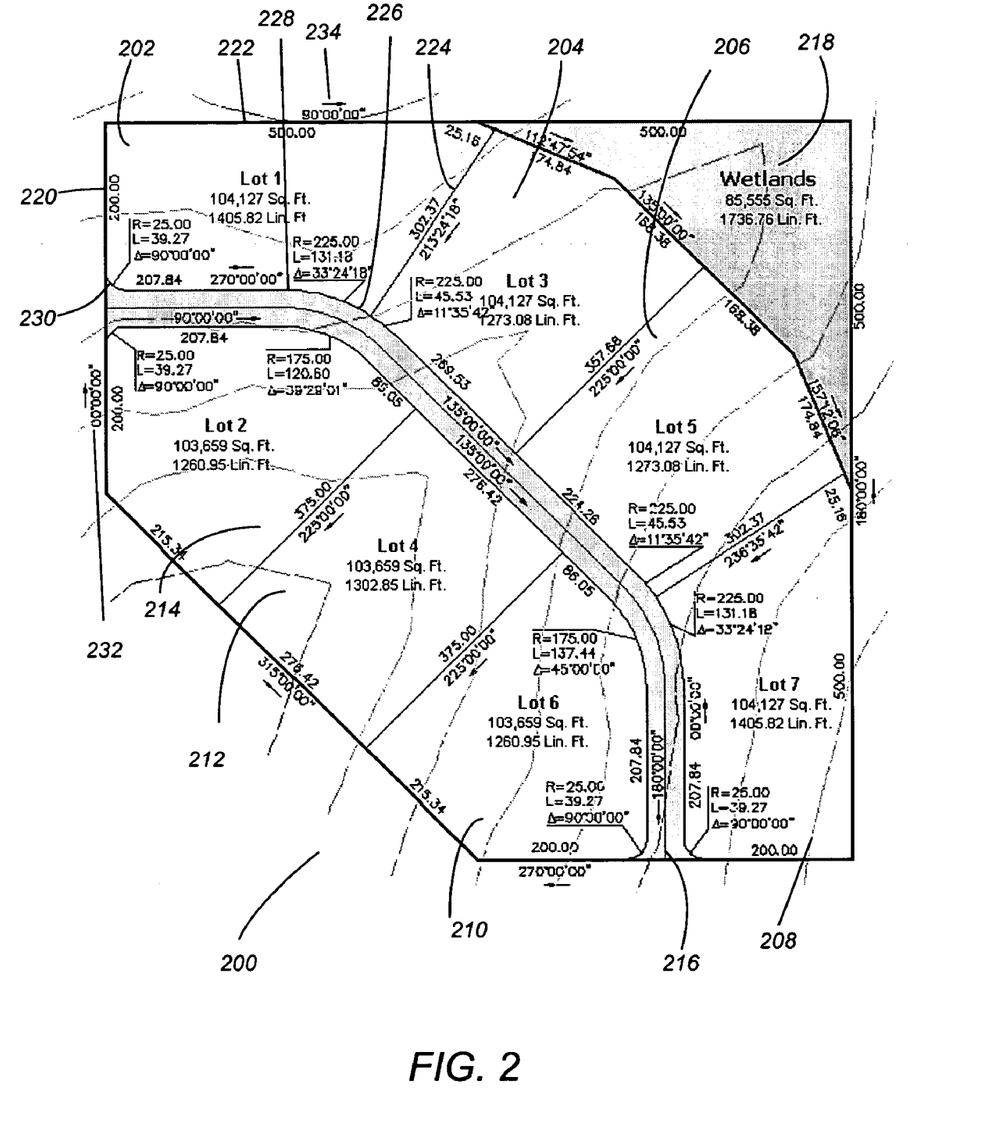
FIG. 2 illustrates a first graphical display of an embodiment of the present invention.

FIG. 2 illustrates a first graphical display of an embodiment of the present invention.

FIG. 2 shows site map 200, with parcels 202, 204, 206, 208, 210, 212, and 214. As described herein, faces define any enclosed area. Further, parcels are faces that may be defined/described via a legal definition such as a definition described in accordance with the statutes, regulations, and ordinances of the State of California or other real property asset. Accordingly, faces may include parcels or any enclosed area that may be defined legally or otherwise. Thus, right-of-way 216 and wetlands 218 shown in FIG. 2 are also faces. The faces 202-214 contain displayed information such as frontage lines, square footage, linear footage, radii of curves, etc. Each parcel 202-214 is defined by lines, curves, arcs, etc. that are joined to form a closed area. For example, and not by way of limitation, parcel 202 is defined by line 220, line 222, line 224, radius 226, line 228, and radius 230. Line 220 is defined as a straight line, two hundred feet long, in a northern direction (designated as 0 degrees, 0 minutes, and 0 seconds by designation 232). Line 222 is defined as a straight line, five hundred feet long, in an easterly direction (designated as 90 degrees, 0 minutes, and 0 seconds by designation 234). Lines 220, 222, 224, radius 226, line 228, and radius 230 form a closed area, which defines parcel 202. Line 224 is shared with parcel 204, and helps define parcel 204 as well as parcel 202. Similarly, radius 226, line 228, and radius 230 abut right-of-way 216, and help to define right-of-way 216 as well as parcel 202.

The structure of the present invention allows for determination of areas and linear footage based on the lines and radii which are used to form parcels 202-214. For example, and not by way of limitation, parcel 202 has an area of 104,127 square feet, which is determined by the CAD/GIS program 108 using the area defined by the lines 220-224, radius 226, line 228, and radius 230.

Figure 3:
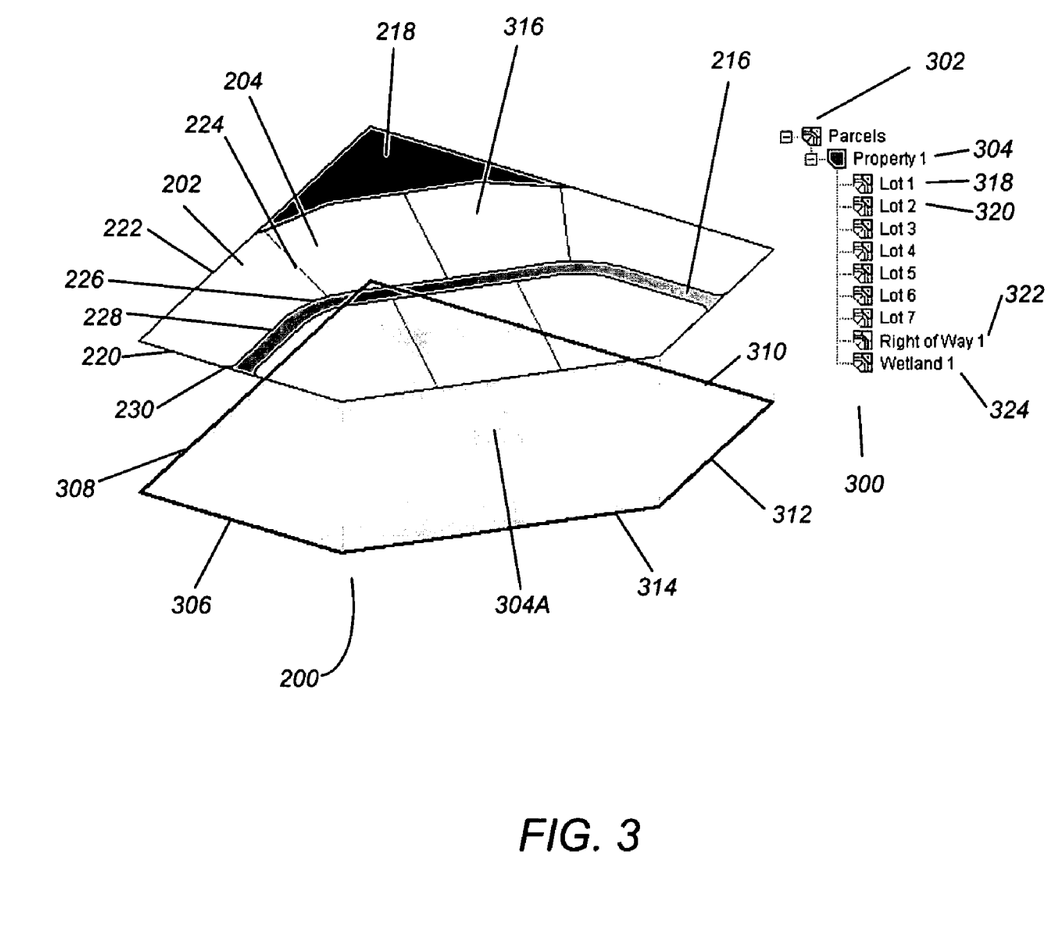
FIG. 3 illustrates an embodiment of the present invention showing expanded view of the face/parcels, face/right-of-way, and other features of the present invention.

FIG. 3 illustrates an embodiment of the present invention showing expanded view of the faces including parcels 202-214, right-of-way 216, and other features of the present invention.

Site map 200 is now shown in a layered or expanded view, with hierarchy 300 illustrated. Each site is divided up into separate root faces 304, with a specific property being given a name. As an example, and not by way of limitation, root face 304A is given a name "Property 1" in the hierarchy 300. Each root face 304 can then be further subdivided into lots, streets, parks, or other areas of land as described further herein.

Root face 304A is defined in the CAD/GIS program 108 using lines, similar to the lines used to define parcel 202 described with respect to FIG. 2. In this instance, root face 304A is defined using lines 306-314, which form a closed polygon that defines the boundaries and area of root face 304A. The spatial coordinates that define this polygon are stored in the hierarchy 300 in the "Property 1" folder 304. Other properties that are part of site 302 can be defined and stored in other property folders 304 as needed to define the entire site 302. Further, additional sites 302 can be added as needed to define other areas of land being subdivided. The lines 306-314 may be used to act as a boundary of other root faces 304, depending on the geographic location of the other root faces 304 or sites 302, respectively.

Shown as a separate layer in the hierarchy is the lot layer 316. This layer is a subordinate layer to property layer 304, and comprises the definitions of lots, right-of-ways, parks, and other sectional areas of root face 304. Each of the lots, right-of-ways, parks, and other sectional areas are completely contained within root face 304, and, as such, appear as lower levels in the hierarchy 300. For example, and not by way of limitation, parcel 202 is shown as "Lot 1" folder 318, parcel 204 is shown as "Lot 2" folder 320, right-of-way 216 is shown as "Right-of-way 1" folder 322, wetlands 218 is shown as "Wetland 1" folder 324 in the hierarchy 300. In order to maintain this hierarchy 300, the lines/boundaries associated with each face, for example, parcel 202, must lie completely within the area defined by the lines/boundaries of root face/parcel 304A. In this case, the lines 306-314 define root face 304A. Each line or radius associated with face 202, i.e., lines 220, 222, 224, radius 226, line 228, and radius 230, lie completely within, or are coextensive with, lines 306-314. Thus, the definitions for parcel 202, which would be placed in a folder 318 by the CAD/GIS program 108, would automatically be placed by the present invention as a subordinate or child folder 318 underneath "Property 1" folder 304. Similarly, as parcel 204 is defined, the present invention would note that the entire defined area of parcel 204 is within the area defined by parcel 304A, and the system would place the definition of parcel 204 as a subordinate or child folder 320 underneath "Property 1" folder 304.

The system of the present invention determines the hierarchical relationship between faces by first dividing the faces into the smallest possible pieces, according to the provided linework. After subdividing the face in this way, faces of any level may be reconstructed by walking the edges of the topology and using the information stored in the edges to determine which way to turn. For instance, consider the point at which the line that separates wetlands 218 from parcel 202 meets the outside boundary line 222. When navigating through this point, it is possible to either stay straight and follow the outside boundary of face 304A, or turn along the shorter line and follow the boundary of parcel 202. The level of navigation determines which path is taken. Properties stored on the linework segments allow the present invention to determine which route to take. These properties include, but are not limited to a level number and line type classification.

The system of the present invention, if implemented in an object oriented programming environment, can use pointers or other methods to determine whether parcel 204 is completely within root face 304A. Other methods can be used, such as determination of area within another area, determination of points wholly within the boundaries of other points, or other methods, depending on the programming environment or the program logic used within any given programming environment to implement the system of the present invention.

Hierarchy Relationships and Requirements

Faces are collected in the CAD/GIS program 108 in a hierarchical relationship upon creation within the present invention. Parcels 202-214 typically comprise boundary segments, area, area labels, segment labels, and a buildable area definition that help define the parcels 202-214. Each parcel collection requires a root face 304, which has a specific icon in the hierarchy 300 to indicate the status of root face. Each site map 200 can have only one collection of faces/parcels.

Further, the collection of faces/parcels can have only one root face/parcel 304, which must encompass all of the other faces/parcels 202-214 within the system. The root face/parcel 304 will always be automatically placed at the top of the hierarchy 300 by the CAD/GIS program 108, and the root face/parcel level of the hierarchy 300 can contain only one face/parcel, which is the root face/parcel 304.

Root faces 304 can have an unlimited number of child faces/parcels 202-214 at different hierarchy levels. Child faces/parcels 202-214 cannot exist at the same level as the root face/parcel 304. Further, one child face/parcel 202-214 cannot overlap any other child face/parcel 202-214, but a child face/parcel 202-214 can exist as an "island" completely surrounded by another child face/parcel 202-214. A child face/parcel 202-214 that wholly contains another child face/parcel can be represented by a different icon within hierarchy 300 to indicate to the user that there is a special relationship existing for that child face/parcel 202-214.

Right-of-ways 216 are special child faces (and possibly parcels), typically represented by a different icon within the hierarchy 300. Child faces/parcels 202-214 cannot exist within a face/right-of-way 216. Special definitions can be used with child faces/parcels 202-214 that front right-of-way faces 216.

Additional Levels of Hierarchy

Figure 4:
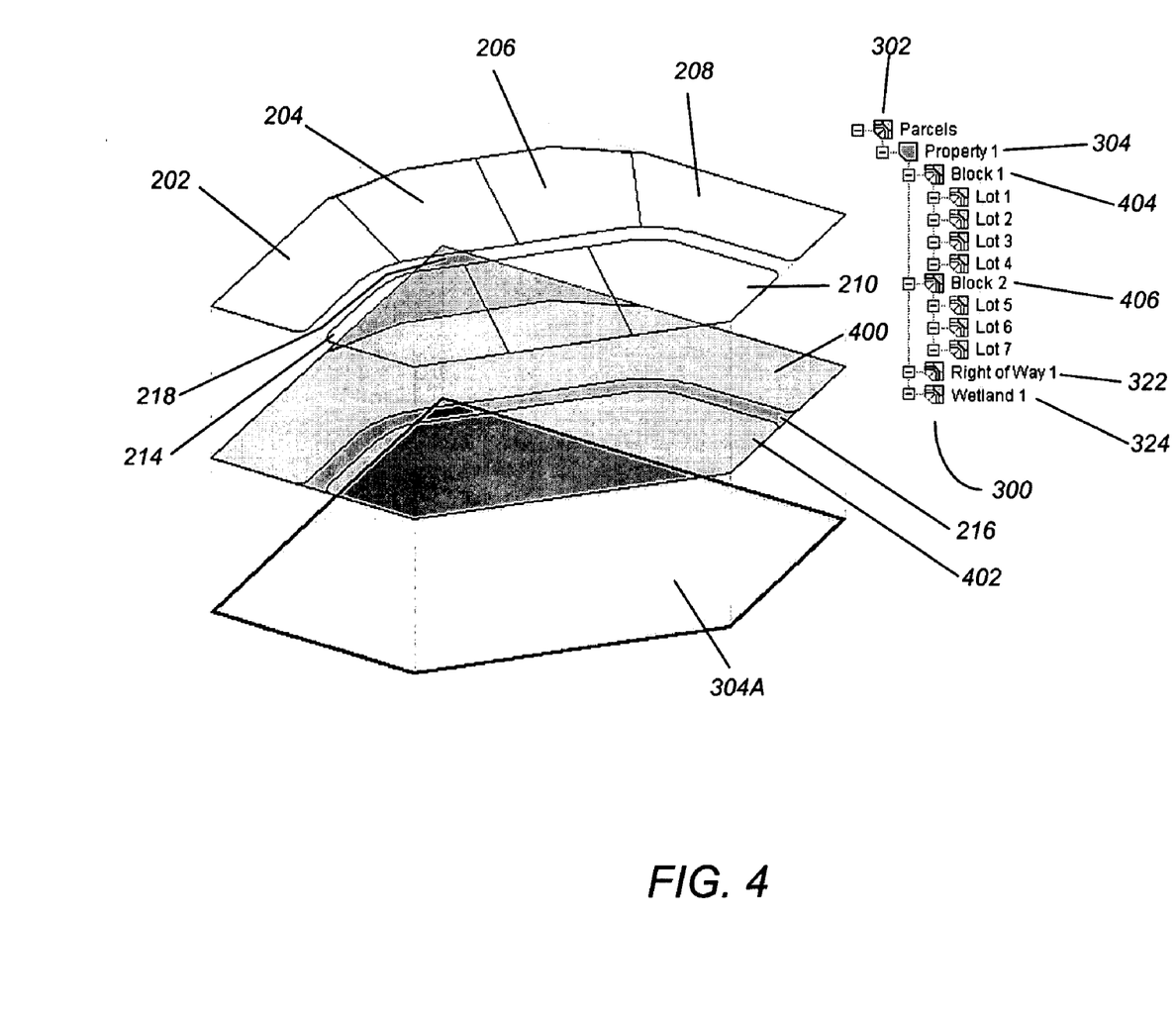
FIG. 4 illustrates another embodiment of the present invention.

FIG. 4 illustrates another embodiment of the present invention.

Hierarchy 300 again contains folder 304, which contains the definitions for face/parcel 304A. Hierarchy 300 also contains Right-of-way 1 folder 322 and Wetland 1 folder 324, which contain the definitions of right-of-way 216 and wetlands 218 respectively. This embodiment allows for the definition of blocks 400 and 402, with corresponding folders Block 1 folder 404 and Block 2 folder 406 respectively. Blocks 402 and 404 can be used to define specific tracts of lots as different than other tracts of lots within a face/parcel of land, or to differentiate between one tract of home and another as the CAD/GIS program's 108 definition of the face/parcel 304A is being developed. For example, certain homes may front on a golf course, while others front on wetlands. When a prospective developer reviews the face/parcel, they may want to be able to resize or reshape the lots that front on the wetlands face because of costs, or because the developer wants to define sewer lines, easements, or other global items without affecting the lot sizing. This expansion of the hierarchy allows developers to include features such as sewer lines, easements, and other items within the block 402 and 404 definitions, without affecting the lot definitions 202-214.

For example, and not by way of limitation, the definitions in Block 1 folder 404 may contain a minimum lot size since the lots that front or immediately abut wetlands 218 must, because of local building codes and requirements, have a certain minimum lot size. Since the lots in Block 2 folder 402 do not directly abut or front wetlands face 218, these lots (defined by parcels 210-214) may not have those minimum lot sizes, and thus are able to be resized by developers to be smaller than the lots that are located within Block 1 folder 404. This additional feature allows developers to maintain precision and accuracy when presenting CAD/GIS plans to municipalities which levy additional requirements based on various local needs or preexisting master plans.

Additional Uses for Face/Parcel Descriptions

Figure 5:
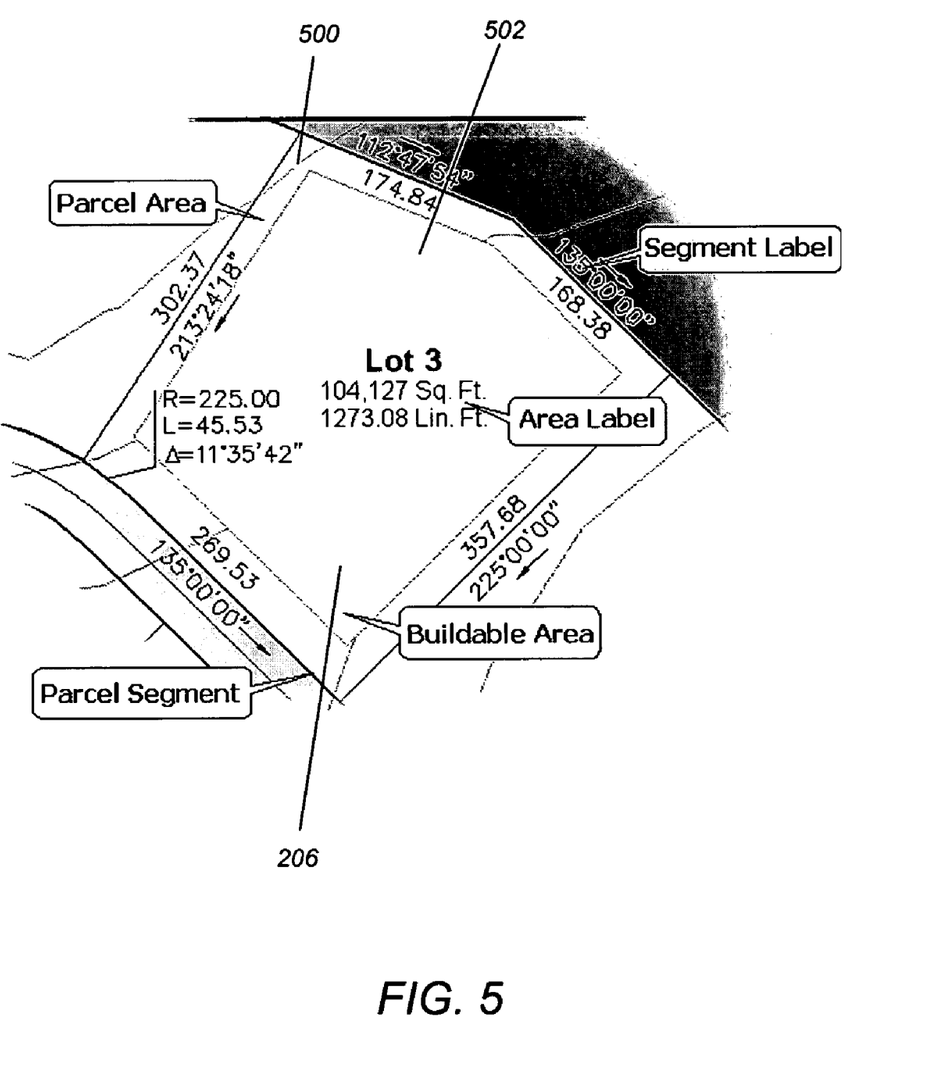
FIG. 5 illustrates typical items used to describe a face/parcel as used in the present invention.

FIG. 5 illustrates typical items used to describe a face/parcel as used in the present invention.

FIG. 5 illustrates parcel 206, with additional details about parcel 206. For example, and not by way of limitation, many lots or parcels require certain setbacks from the property lines such that buildings cannot be built on the entire area of a lot or parcel. These setbacks are usually established by code or local code for each community or municipality, but can vary depending on the zoning of the lot or the area of the community where the lot or face/parcel is located. Such definitions can be programmed globally into the CAD/GIS program 108 of the present invention, or defined in blocks or areas as defined with respect to FIG. 4.

Parcel 206 is shown with a setback area inset into the entire parcel area. The setback area 500 is the area in between the lines, radii, arcs, etc. that define the boundaries of parcel 206 and the buildable area 502. Further, the setback area, while it may be globally defined, may also have other items that add to the non-buildable area of parcel 206, in essence, reducing the buildable area 502. For example, and not by way of limitation, there may be additional properties, e.g., topographical information, such as a river or stream traversing face/parcel 206, sewer easements, right-of-way easements, or other easements appurtenant to face/parcel 206, or other statutes, codes, or other factors that may further reduce the buildable area 502 of any given parcel 206. Such factors can reside either in a global definition which may be located in the top level 302 of hierarchy 300, in individual property folders 304, in block folders 404, or in individual lot folders such as folder 318.

Figure 6:
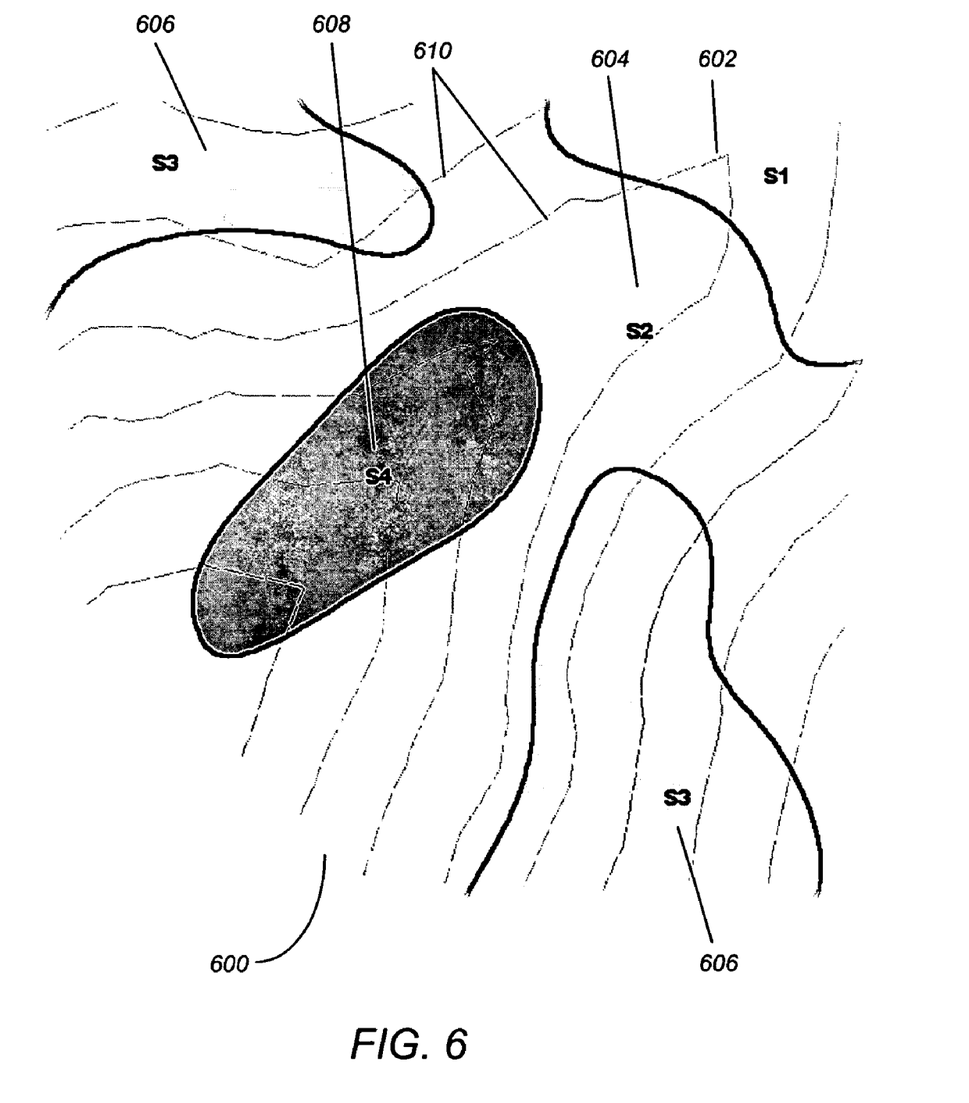
FIG. 6 illustrates a soil sampling and topographic map used in the present invention.

FIG. 6 illustrates a soil sampling and topographic map used in the present invention.

Sample map 600 comprises soils area S1 602, soil area S2 604, soil area S3 606, and soil area S4 608. Within each soil area 602-608, topographic lines 610 may be included to show topographic features throughout sample map 600.

Figure 7:
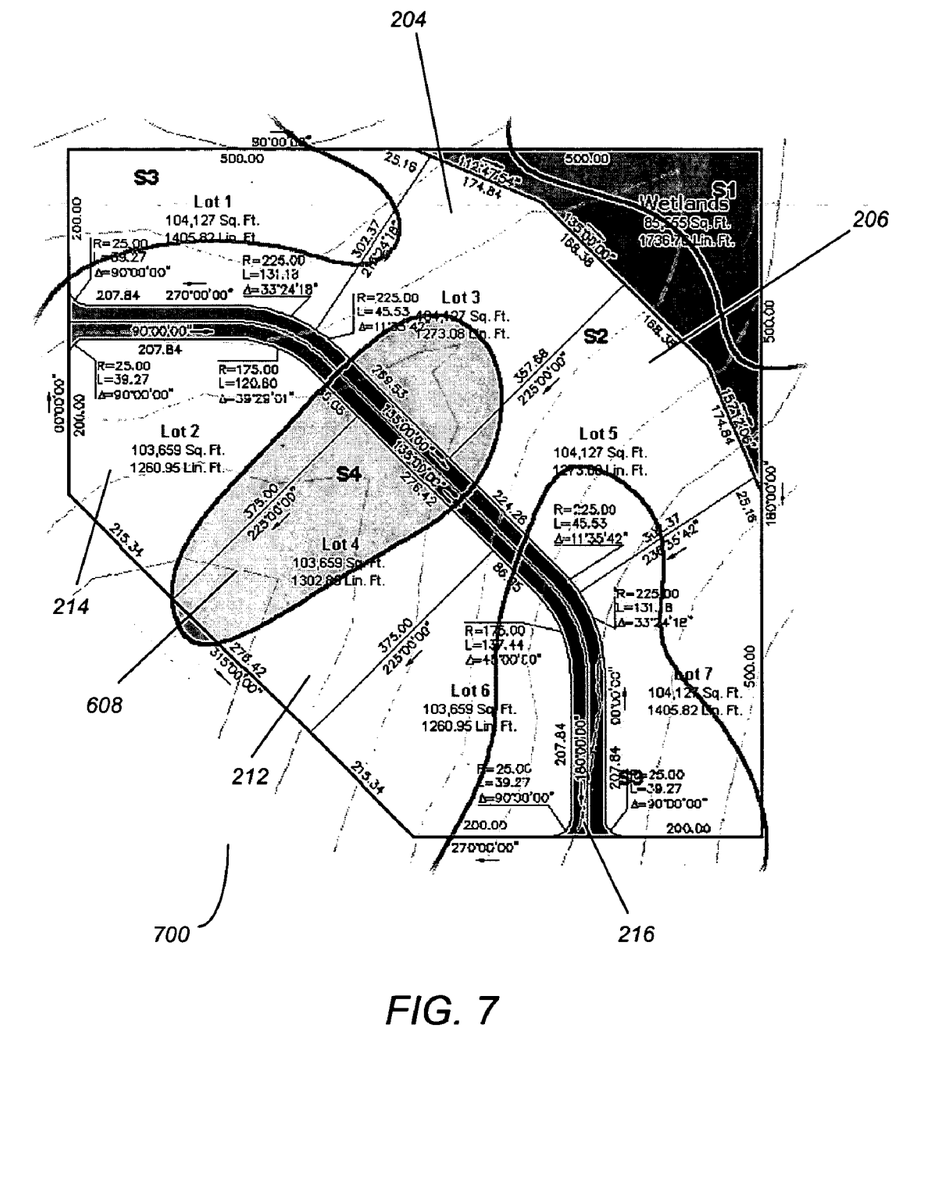
FIG. 7 illustrates an overlayment of a soil sampling and topographic map and a subdivision map as used in the present invention.

FIG. 7 illustrates an overlayment of a soil sampling and topographic map and a subdivision map as used in the present invention.

Overlay map 700 illustrates the types of soil, as well as the topography, of the subdivision described with respect to FIGS. 2-6. As seen in FIG. 7, soil area S4 608 is partially contained within parcel 212, as well as parcel 214. Further, soil area S4 608 crosses right-of-way 216. This information is of importance to developers because if soil area S4 608 is sand, then different costs and requirements may be levied on such soil than if soil area S4 608 is clay or bedrock. Further, such soil area S4 608 may impact the buildable area of parcels 212 and 214, as well as the buildable area of parcels 204 and 206 which soil area S4 608 also impinges upon. The present invention allows for the soil area definition to be flowed down into lower levels of the hierarchy 300, without destroying the definition of soil area S4 608 and other soil areas. These definitions can be located in a higher level of the hierarchy to protect those data types and values.

Figure 8:
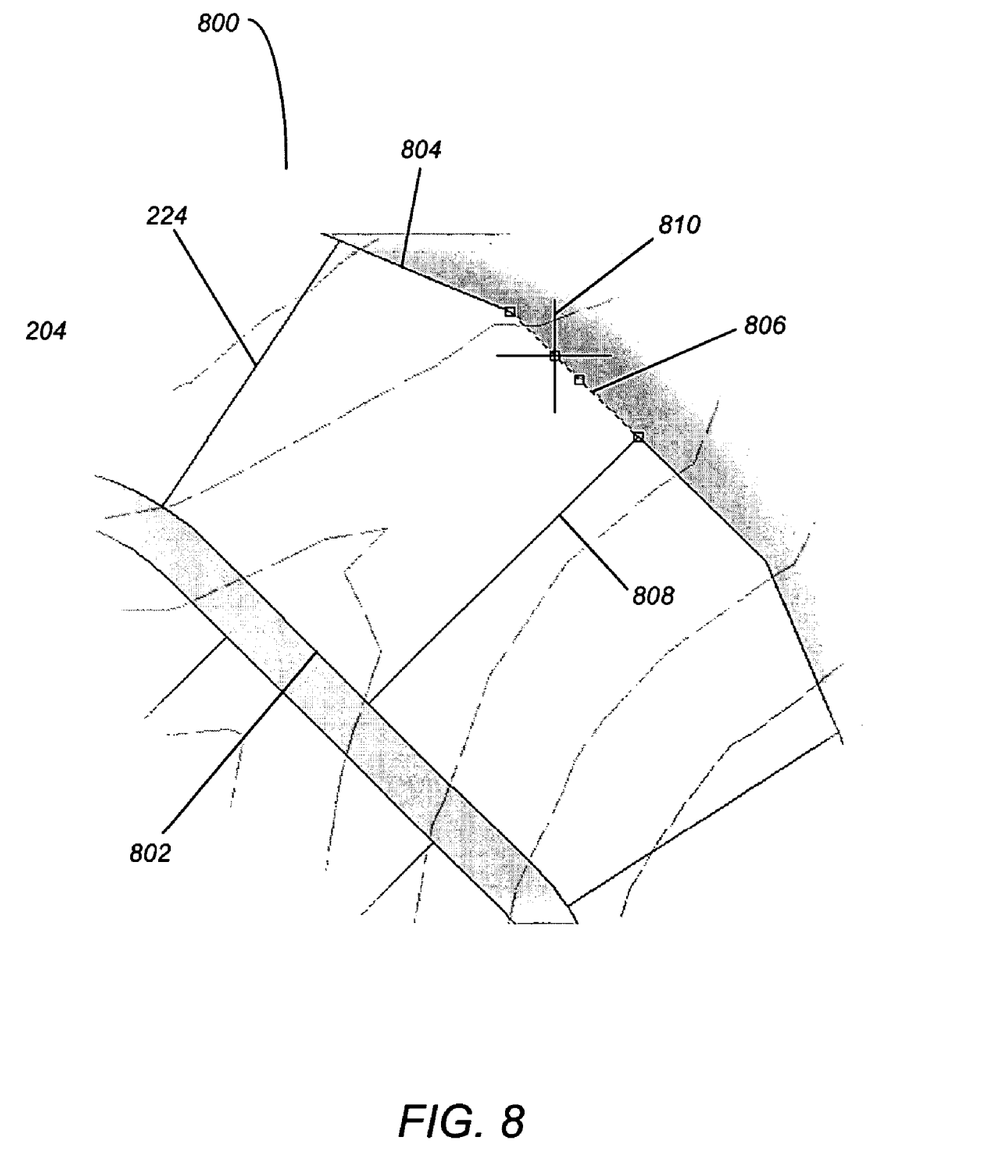
FIG. 8 illustrates a boundary selected for deletion within the present invention.

FIG. 8 illustrates a face selected for deletion within the present invention.

Portion 800 of site map 200 shows face/parcel 204, with boundary lines 224 and 802-808 defining face/parcel 204. Boundary line 806 is selected by the user, which is shown by cursor 810 being placed on boundary line 806, as well as boundary line 806 being shown as a dashed line. The user can delete boundary line 806 through any one of several standard or customized techniques which are present in the CAD/GIS program 108.

Figure 9:
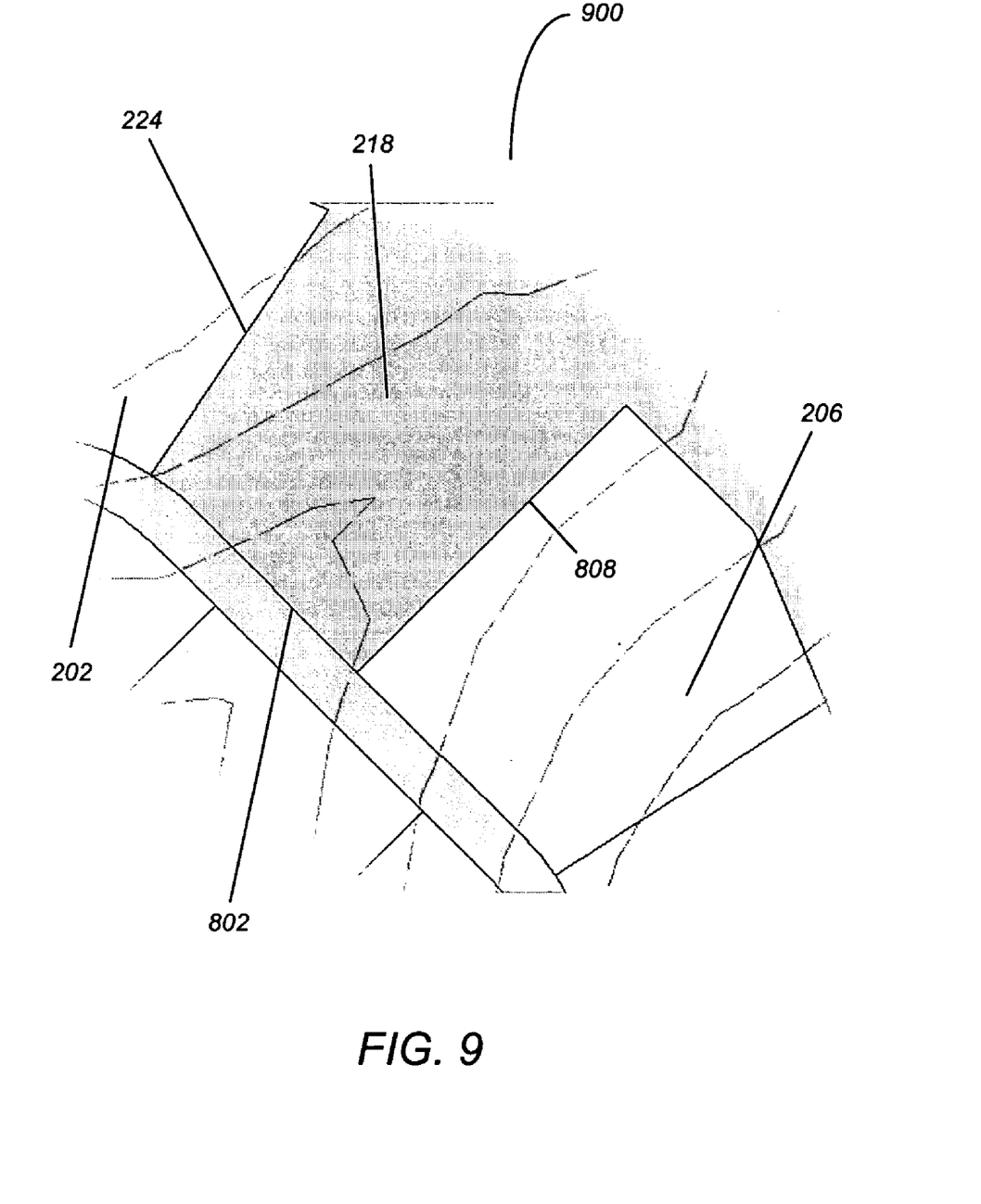
FIG. 9 illustrates the site map after the deletion of the selected boundary within the present invention.

FIG. 9 illustrates the site map after the deletion of the selected face within the present invention.

The parcel 204, once boundary line 806 is deleted, is no longer a closed polygon (i.e., it is no longer a face). The CAD/GIS program 108 of the present invention realizes this and automatically deletes boundary line 804 from the memory of the system. The CAD/GIS program 108 of the present invention also realizes that boundary lines 224, 808, and 802 cannot be deleted, because they are used to define other faces/parcels or regions within site map 900. For example, and not by way of limitation, boundary line 224 is used to define not only former parcel 204, it also defines parcel 202.

The CAD/GIS program 108 of the present invention, when implemented in an object-oriented programming environment, can use pointers to determine which boundaries to delete. For example, and not by way of limitation, boundary line 224 would have a pointer that points to parcel 202 and parcel 204. Although the pointer to parcel 204 would be deleted, boundary line 224 cannot be deleted completely, because there is still a pointer to parcel 202, which still exists at the time of deletion of boundary line 806. As such, boundary line 224 would not be deleted at this time. Other methods can be used depending on the programming environment or programming structure within a given programming environment.

Once parcel 204 is deleted, the area underneath former parcel 204 reverts to a different face within the hierarchy. In this case, the area reverts to wetlands 218, since the area under former parcel 204 is no longer separated from wetlands 218 by the line that was deleted. However, the area may revert to other faces depending on the community standards or other rules programmed into the CAD/GIS program 108 as well as the geometry, the reversion of the area underneath former parcel 204 may change the size of other parcels 202 or force other events to occur. For example, and not by way of limitation, there may be a local ordinance that requires there to be at least two lots having at least a 50 foot frontage on any wetland area. Once parcel 204 is deleted, there will only be one lot having such a frontage, namely, parcel 206. The CAD/GIS program 108 of the present invention may inform the user of this occurrence, prevent the user from deleting parcel 204, or take some other action, depending on the programming used within the CAD/GIS program 108.

Flowchart

Figure 10:
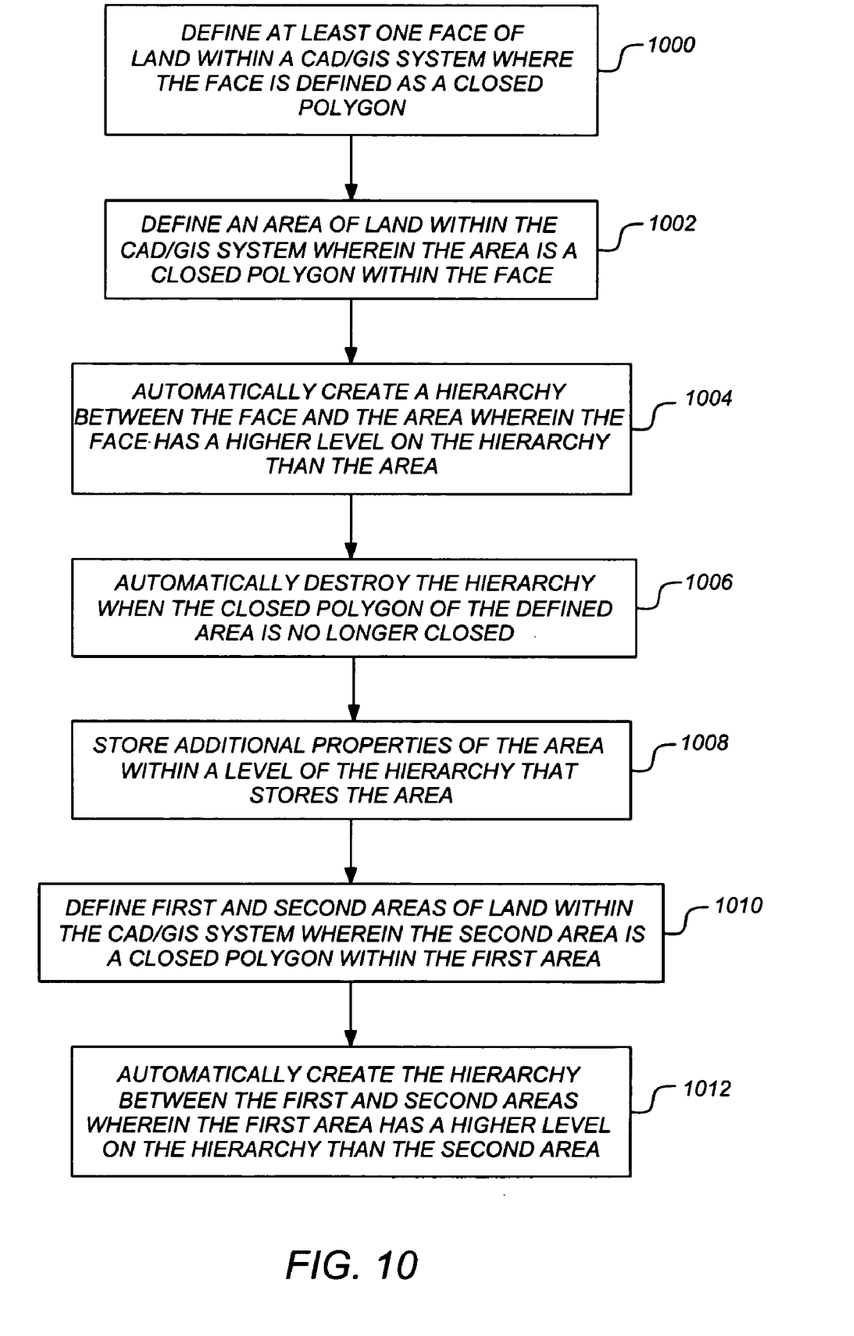
FIG. 10 is a flowchart illustrating the steps of the present invention.

FIG. 10 is a flowchart illustrating the steps of the present invention.

Box 1000 illustrates performing the step of defining at least one face/parcel of land within the CAD/GIS system, where the face/parcel is defined as a closed polygon.

Box 1002 illustrates performing the step of defining at least one area of land within the CAD/GIS system, wherein the area is a closed polygon within the face/parcel.

Box 1004 illustrates performing the step of automatically creating a hierarchy between the face/parcel and the area within the CAD/GIS system, wherein the face/parcel has a higher level on the hierarchy than the area.

Box 1006 illustrates performing the step of automatically destroying the hierarchy within the CAD/GIS system when the closed polygon of the defined area is no longer closed.

Box 1008 illustrates performing the step of storing additional properties of the area within the CAD/GIS system within a level of the hierarchy that stores the area.

Box 1010 illustrates performing the step of defining a first and a second area of land within the CAD/GIS system, wherein the second area is a closed polygon within the first area.

Box 1012 illustrates performing the step of automatically creating the hierarchy between the first area and the second area within the CAD/GIS system, wherein the first area has a higher level on the hierarchy than the second area.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide methods, apparatuses, and articles of manufacture for creating hierarchical relationships in a computer assisted design and geographic information (CAD/GIS) system. A method in accordance with the present invention comprises defining at least one face within the CAD/GIS system, where the face is defined as a closed polygon, defining at least one area of land within the CAD/GIS system, wherein the area is a closed polygon within the face/parcel, and automatically creating a hierarchy between the face/parcel and the area within the CAD/GIS system, wherein the face/parcel has a higher level on the hierarchy than the area.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

What is claimed is:

1. A method for creating hierarchical relationships in a computer assisted design and geographic information (CAD/GIS) system, comprising:
    defining at least one face of land within the CAD/GIS system, where the face is defined as a closed polygon;
    defining at least one area of land within the CAD/GIS system, wherein the area is a closed polygon within the face; and
    automatically creating a hierarchy between the face and the area within the CAD/GIS system, wherein the face has a higher level on the hierarchy than the area, and wherein said automatically creating is dynamically performed as the face and/or area is entered into the CAD/GIS system.

2. The method of claim 1, further comprising:
    deleting a boundary of the closed polygon, wherein the deleting results in the polygon no longer being closed; and
    in response to the deleting, automatically and dynamically destroying the hierarchy within the CAD/GIS system.

3. The method of claim 1, further comprising storing additional properties of the area within the CAD/GIS system, wherein the additional properties comprise buildable area, easements, and setbacks, within a level of the hierarchy that stores the area.

4. The method of claim 1, further comprising
    defining a first and a second area of land within the CAD/GIS system, wherein the second area is a closed polygon within the first area; and
    automatically creating the hierarchy between the first area and the second area within the CAD/GIS system, wherein the first area has a higher level on the hierarchy than the second area.

5. The method of claim 1, wherein the area is further defined as a lot, a right-of-way, a wetland, an easement, or an open space.

6. The method of claim 1, wherein the face is further defined using easements for sewers, utilities, or right-of-ways.

7. The method of claim 1 further comprising automatically and dynamically updating the hierarchy as faces and/or areas are graphically edited by a user in the CAD/GIS system.

8. The method of claim 1 further comprising:
    modifying a property of the area within the CAD/GIS system; and
    in response to said modifying, automatically and dynamically updating the hierarchy.

9. The method of claim 1 further comprising automatically and dynamically displaying the hierarchy.

10. An apparatus for creating hierarchical relationships in a computer assisted design and geographic information (CAD/GIS) system comprising:
    (a) a computer system having a memory and a data storage device coupled thereto;
    (b) one or more CAD/GIS programs, performed by the computer:
        (i) for defining at least one face of land within the CAD/GIS system, where the face is defined as a closed polygon;
        (ii) for defining at least one area of land within the CAD/GIS system, wherein the area is a closed polygon within the face; and
        (iii) for automatically creating a hierarchy between the face and the area within the CAD/GIS system, wherein the face has a higher level on the hierarchy than the area, and wherein said automatically creating is dynamically performed as the face and/or area is entered into the CAD/GIS system.

11. The apparatus of claim 10, further comprising a computer program performed by the computer for:
   deleting a boundary of the closed polygon, wherein the deleting results in the polygon no longer being closed; and
   in response to the deleting, automatically and dynamically destroying the hierarchy within the CAD/GIS system.

12. The apparatus of claim 10, further comprising a computer program performed by the computer for storing additional properties of the area within the CAD/GIS system, wherein the additional properties comprise buildable area, easements, and setbacks, within a level of the hierarchy that stores the area.

13. The apparatus of claim 10 further comprising one or more computer programs, performed by the computer,
   for defining a first and a second area of land within the CAD/GIS system, wherein the second area is a closed polygon within the first area; and
   for automatically creating the hierarchy between the second area and the area within the CAD/GIS system, wherein the first area has a higher level on the hierarchy than the second area.

14. The apparatus of claim 10 wherein the area is further defined as a lot, a right-of-way, a wetland, an easement, or an open space.

15. The apparatus of claim 10 wherein the face is further defined using easements for sewers, utilities, or right-of-ways.

16. The apparatus of claim 10 further comprising a computer program performed by the computer for automatically and dynamically updating the hierarchy as faces and/or areas are graphically edited by a user in the CAD/GIS system.

17. The apparatus of claim 10 further comprising a computer program performed by the computer for:
   modifying a property of the area within the CAD/GIS system; and
   in response to said modifying, automatically and dynamically updating the hierarchy.

18. An article of manufacture comprising a program storage medium readable by a computer and embodying one or more instructions executable by the computer to perform a method for automatically creating hierarchical relationships in a computer assisted design and geographic information (CAD/GIS) system, the method comprising:
   defining at least one face of land within the CAD/GIS system, where the face is defined as a closed polygon;
   defining at least one area of land within the CAD/GIS system, wherein the area is a closed polygon within the face; and
   automatically creating a hierarchy between the face and the area within the CAD/GIS system, wherein the face has a higher level on the hierarchy than the area, and wherein said automatically creating is dynamically performed as the face and/or area is entered into the CAD/GIS system.

19. The article of manufacture of claim 18, the method further comprising:
   deleting a boundary of the closed polygon, wherein the deleting results in the polygon no longer being closed; and
   in response to the deleting, automatically and dynamically destroying the hierarchy within the CAD/GIS system.

20. The article of manufacture of claim 18, further comprising storing additional properties of the area within the CAD/GIS system, wherein the additional properties comprise buildable area, easements, and setbacks, within a level of the hierarchy that stores the area.

21. The article of manufacture of claim 18, further comprising
   defining a first and a second area of land within the CAD/GIS system, wherein the second area is a closed polygon within the area; and
   automatically creating the hierarchy between the first area and the second area within the CAD/GIS system, wherein the first area has a higher level on the hierarchy than the second area.

22. The article of manufacture of claim 18, wherein the area is further defined as a lot, a right-of-way, a wetland, an easement, or an open space.

23. The article of manufacture of claim 18, wherein the face is further defined using easements for sewers, utilities, or right-of-ways.

24. The article of manufacture of claim 18 further comprising automatically and dynamically updating the hierarchy as faces and/or areas are graphically edited by a user in the CAD/GIS system.

25. The article of manufacture of claim 18 further comprising:
   modifying a property of the area within the CAD/GIS system; and
   in response to said modifying, automatically and dynamically updating the hierarchy.

* * * * *